United States Patent [19]

Leitner et al.

[11] E Re. 29,267

[45] Reissued June 21, 1977

[54] APPARATUS FOR STRAIGHTENING FABRIC

[75] Inventors: Frank Wilhite Leitner; William Thomas Griffin, both of Charlotte, N.C.

[73] Assignee: Coltron Industries, Inc., Matthews, N.C.

[22] Filed: Feb. 20, 1976

[21] Appl. No.: 659,935

Related U.S. Patent Documents

Reissue of:

[64] Patent No.: 3,839,767
Issued: Oct. 8, 1974
Appl. No.: 243,385
Filed: Apr. 12, 1972

[52] U.S. Cl. ..... 26/51.5
[51] Int. Cl.² ..... D06H 3/12
[58] Field of Search ..... 26/51.3, 51.4, 51.5, 26/52

[56] References Cited

UNITED STATES PATENTS

| | | | |
|---|---|---|---|
| 2,106,612 | 1/1938 | La Pierre et al. | 26/51.5 |
| 2,209,220 | 7/1940 | Berry | 26/51.5 |
| 2,233,644 | 3/1941 | Smiley | 26/51.5 |
| 2,311,406 | 2/1943 | Mansfield et al. | 26/51.5 UX |
| 2,966,593 | 12/1960 | Leimer et al. | 26/51.5 X |
| 3,146,511 | 9/1964 | Hoffman | 26/51.4 |
| 3,169,193 | 2/1965 | Strang | 26/51.5 X |
| 3,402,443 | 9/1968 | Leitner et al. | 26/51.5 |
| 3,430,310 | 3/1969 | Richbourg | 26/51.3 UX |

FOREIGN PATENTS OR APPLICATIONS

| | | | |
|---|---|---|---|
| 370,189 | 4/1932 | United Kingdom | 26/51.3 |
| 150,429 | 10/1961 | U.S.S.R. | 26/51.4 |
| 180,168 | 8/1966 | U.S.S.R. | 26/51.4 |

OTHER PUBLICATIONS

Coltron Solid State Fabric Straighteners, Bulletin CO-L-100, July, 1967.

*Primary Examiner*—Robert R. Mackey
*Attorney, Agent, or Firm*—Bell, Seltzer, Park & Gibson

[57] ABSTRACT

An apparatus for correcting skew and/or bow distortions in woven or knitted fabrics during tentering in which the relative speed of two laterally spaced, driven fabric-engaging means or tenter chains is varied without altering the mean speed of the two fabric-engaging means to thereby obtain a straightened fabric of substantially uniform yield.

12 Claims, 8 Drawing Figures

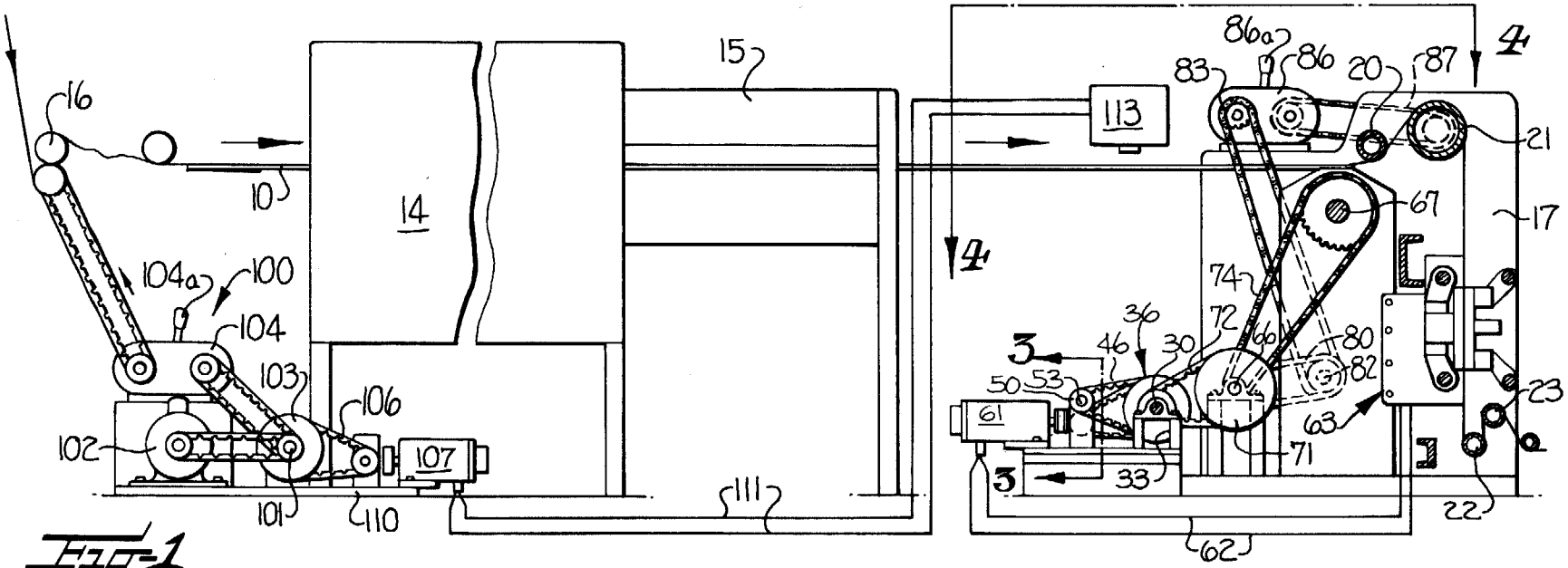
FIG-1
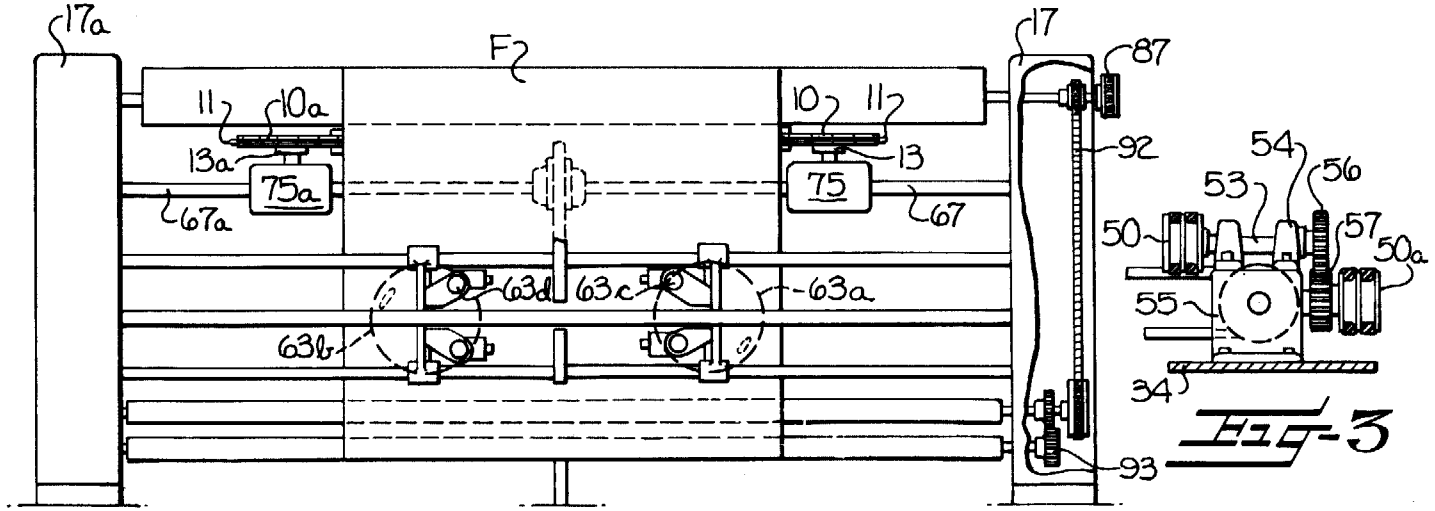
FIG-2
FIG-3

MOTIVE MEANS

APPARATUS FOR STRAIGHTENING FABRIC

Matter enclosed in heavy brackets [ ] appears in the original patent but forms no part of this reissue specification; matter printed in italics indicates the additions made by reissue.

In the processing of most textile fabrics, it is desirable, if not necessary, to tenter the fabrics by laterally tensioning the same, usually while in wet condition or during wet processing, between elongate, forwardly diverging, driven, fabric-engaging members or tenter chains. During such tensioning, the transverse rows of stitches or weft threads, which may be termed as "courses" of the fabrics, frequently become skewed and/or bowed even though such distortions may have been corrected before the tentering operation. Thus, it frequently is necessary to again subject the fabrics to a course straightening process following the tentering operation.

It is also important that certain fabrics, especially knitted fabrics, have a "yield" within predetermined limits; e.g., weight per unit length, picks per unit length or transverse rows of stitches per unit length, depending upon the nature of the fabric and the products to be formed therefrom.

Heretofore, because of the straight or lineal path through which a fabric must move in its course through a tenter and the necessity, in most instances, for the fabric to be of a "yield" within relatively close limits, to our knowledge, any satisfactory correction of skew distortions in the fabric has been effected before and/or after the fabric has been processed through a tenter.

It is therefore an object of this invention to provide an improved method and means for correcting distortions in fabric in its course through a tenter while obtaining a fabric of substantially uniform yield within prescribed limits throughout its length.

Another object of the invention is to provide a method and means for correcting skew distortions in a fabric in its course through a tenter wherein the forward speed of both side edge portions of the fabric is varied, each relative to the other, to correct the skew distortions without altering the mean rate of speed of the fabric through the tenter.

According to the invention, a fabric is tensioned laterally between a pair of forwardly driven fabric-engaging members or tenter chains, and skew and/or bow distortions therein are detected. In response to detection of a skew distortion, in which one side edge portion of the fabric is skewed forwardly of the opposite side edge portion, the forward speeds of both fabric-engaging members are varied proportionally relative to each other to reduce and increase the forward speeds of the respective one and opposite side edge portions of the fabric for correcting the skewed condition thereof without altering the mean speed of the fabric moving with the fabric-engaging means.

In response to detection of a bowed condition in the fabric, the speed of a stripper roll means, located adjacent to the egress end of the tenter, is varied relative to the mean forward speed of the fabric-engaging means so as to compensatively stretch or relax the central portion of the fabric longitudinally between the two fabric-engaging means and thereby to correct the bowed condition in the fabric.

Some of the objects and advantages of the invention having been stated, others will appear as the description proceeds when taken in connection with the accompanying drawings, in which;

FIG. 1 is a schematic side elevation of a tenter equipped with one embodiment of novel apparatus for carrying out the method of this invention;

FIG. 2 is an elevation looking at the egress or right-hand end of the tenter shown in FIG. 1;

FIG. 3 is an enlarged fragmentary elevation looking rearwardly substantially along line 3—3 in FIG. 1;

Figures 4, 5:
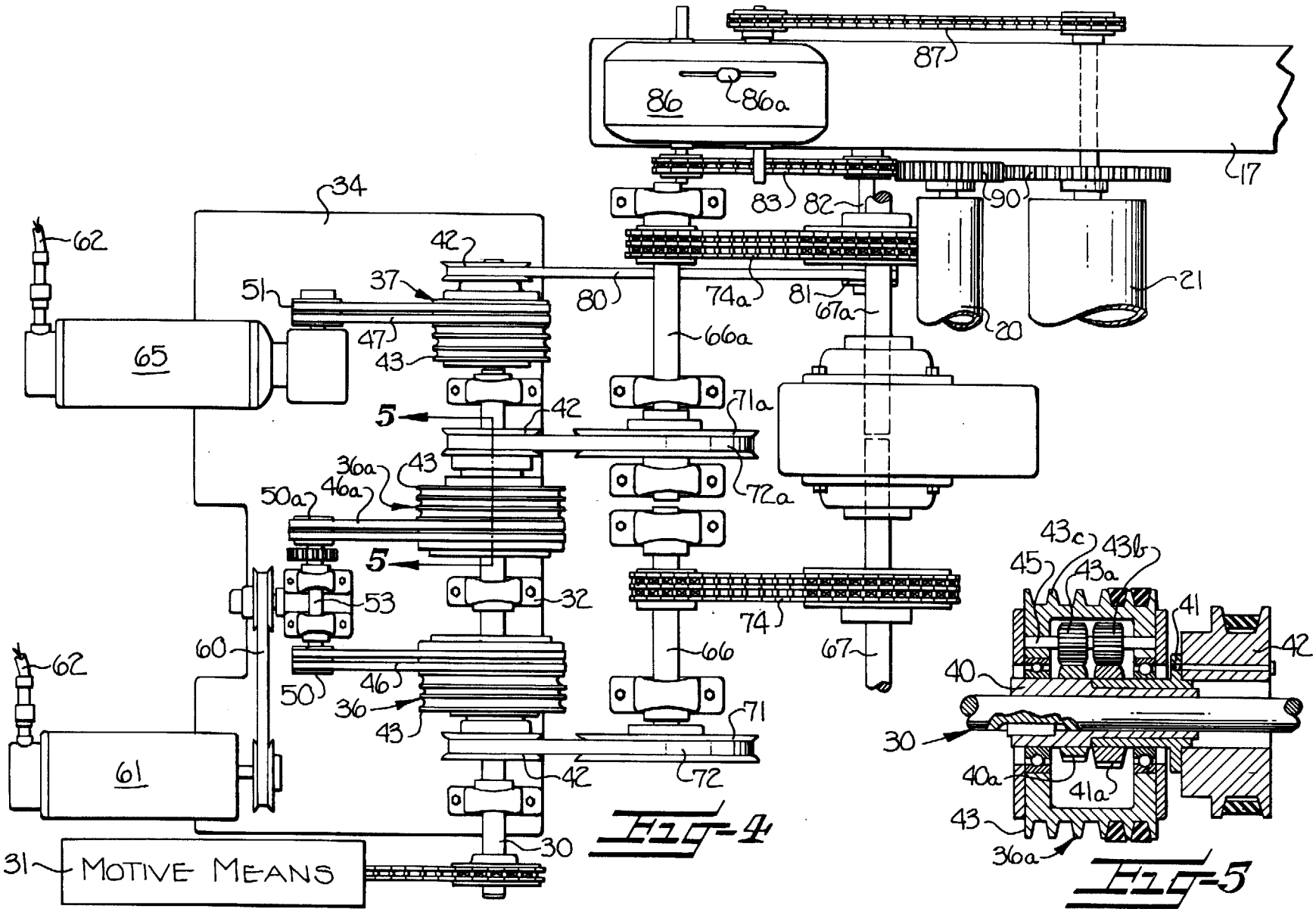
FIG. 4 is an enlarged fragmentary plan view of the first embodiment of drive means for the stripper roll means and the tenter chains, taken substantially along line 4—4 in FIG. 1, but omitting the tenter chains and with other parts broken away for purposes of clarity.
FIG. 5 is a vertical sectional view through one of several differential units taken substantially along line 5—5 in FIG. 4.

Referring more specifically to the drawings, each of the two embodiments of apparatus for carrying out the method of this invention is shown in combination with a tenter provided with the usual pair of elongate, laterally spaced, fabric-engaging means or endless tenter chains 10, 10a. Tenter chains 10, 10a may be of any well known type having longitudinally spaced pins, tenter clips or other holding means 11 for successively receiving, holding and then releasing the opposing side edge portions of fabric F laterally tensioned or stretched between and moved forwardly by tenter chains 10, 10a. Opposing reaches of tenter chains 10, 10a may be up to 60 feet or more in length, and they may be mounted on the usual supporting sprockets, only the front sprockets 13, 13a being shown in FIGS. 2 and 6.

Conventionally, some fabrics, such as cotton fabrics, are treated with a starch solution or subjected to other wet treatment and, while wet, they are subjected to a tentering operation. Other fabrics, containing synthetic fibers, are heat set after scouring and drying by passing the same through a heating chamber or over during a tentering operation, and in some instances, the fabric is subjected to a resin treatment during the tentering operation to impart dimensional stability and crease resistance to the fabric. Therefore, by way of example, the tenter chains 10, 10a extend through a suitable heating chamber or oven 14 and then past a suitable cooling means or fan means 15 disposed adjacent and in front of oven 14 in FIG. 1.

The rear end of oven 14 is spaced forwardly of the rear extremities of tenter chains 10, 10a and suitable feed roll means 16 is provided for feeding the fabric F from a suitable source of supply, not shown, onto the rear portions of tenter chains 10, 10a. The cooling or fan means 15 is spaced rearwardly from opposing, hollowing side frame members 17, 17a (FIG. 2) in which reduced opposite ends of a pair of closely spaced, offset stripper rolls 20, 21 are suitably journaled and which serve as advancing means to strip and advance the fabric forwardly from tenter chains 10, 10a. Also, rolls 20, 21 serve to correct bowed distortions in the fabric F in a manner to be later described. From the rearmost stripper roll 21, the fabric F extends downwardly either in the form of a catenary or in an otherwise substantially relaxed condition or under minimal tension, whereupon the fabric successively passes beneath and then over a pair of driven guide rolls 22, 23 which serve as delivery means to deliver the fabric to any desired form of looping or collecting means such as a scray or J-box, not shown.

According to the invention, means are provided for driving tenter chains 10, 10a at a constant mean forward speed while proportionally oppositely varying the forward speed of the tenter chains 10, 10a relative to each other to correct corresponding skew distortions in the courses of the fabric so that the overall rate of forward travel of the fabric through the tenter is substantially constant at all times during operation of the tenter. Also, in order that the fabric F is of the desired density, within prescribed limits, it is desirable to control precisely the rate at which the fabric is being fed to and stripped from tenter chains 10, 10a in accordance with the means forward speed of tenter chains, 10, 10a.

In some instances, it may be desirable to underfeed the fabric F to the tenter chains 10, 10a. In other instances, especially in the processing of some knitted fabrics, it may be desirable to overfeed the fabric F to tenter chains 10, 10a up to 30 percent faster than that speed at which the fabric F is being advanced by tenter chains 10, 10a and stripper rolls 20, 21. Accordingly, novel means now will be described for driving and controlling the forward speed of tenter chains 10, 10a.

In the first embodiment of the invention, tenter chains 10, 10a and stripper rolls 20, 21 are driven by a common, constant speed, main drive shaft or rotary input element 30 driven by any suitable motive means shown schematically at 31 in FIG. 4. Main drive shaft 30 extends transversely of the tenter and is journaled in a plurality of spaced bearing blocks 32 carried by posts 33 (FIG. 1) secured to or formed integral with a base plate 34. Main drive shaft 30 serves to drive the rotary input portions of three differential units or planetary transmissions, namely, first, second, and third differential units 36, 36a, and 37. The first and second differential units serve as speed variators for the respective tenter chains 10, 10a, and the third differential unit 37 serves as a speed variator for stripper rolls 20, 21. It will be noted that main drive shaft 30 supports and extends through all three differential units 36, 36a, 37, and since they may be of the same construction only differential unit 36a is shown in detail with reference to FIG. 5.

Each differential unit 36, 36a, 37 comprises an inner or axial sleeve or hub 40 keyed or otherwise secured on main drive shaft 30 and serving as the rotary input portion of the differential unit. A rotary output portion or output hub 41 is rotatably mounted on one end portion of input sleeve 40 and has a corresponding output pulley 42 thereon for rotation with hub 41 and loosely encircling main drive shaft 30.

Input and output sun gears 40a, 41a are fixed on the respective hubs 40, 41 on or within a normally stationary rotary member or hollow housing 43 whose opposing end walls are rotatably mounted on hubs 40, 41. Sun gears 40a, 41a are engaged by planetary gear means comprising at least one set of two respective planetary gears 43a, 43b disposed in fixed axial relationship and mounted on a common shaft 45 carried by housing 43 so that gears 43a, 43b may orbit sun gears 40a, 41a during rotation of housing 43.

The planetary gear means normally transmits constant speed rotation from input portion 40 to output portion 41, but if housing 43 is rotated, the speed of output portion 41 is varied accordingly, as is usual in planetary gear systems. Means are provided for rotating each housing 43 forwardly and rearwardly alternatively and at relatively slow speed with respect to the direction of rotation and speed of drive shaft 30 to correspondingly reduce and increase, respectively, the speed of the respective output portions 41.

In the first embodiment, each housing 43 is provided with a plurality of peripheral grooves 43c for receiving corresponding endless belts. As shown in FIG. 4, the housing 43 of differential units 36, 36a, 37 are engaged by respective pairs of endless belts 46, 46a, 47 also mounted on respective pulleys 50, 50a, 51. Pulley 50 is fixed on a shaft 53 journaled in bearings 54 carried by a gear box 55 fixed to base plate 34 (FIG. 3).

Shaft 53 also has a gear 56 fixed thereon meshing with a gear 57 mounted on the output shaft of gear box 55, which output shaft also has the pulley 50a fixed thereon. The input of gear box 55 is driven, at such time as a skewed distortion in the fabric F is to be corrected, by a suitable belt and pulley connection 60 to a reversible electric skew correction control motor 61 (FIG. 4). It is apparent that, whenever motor 61 rotates shaft 53 (FIGS. 3 and 4), since gears 56, 57 are of the same relative diameter, pulleys 50, 50a are of the same relative diameter, and housings 43 of units 36, 36a are of the same relative diameter, both of the latter housings 43 are rotated at the same angular speed and in direct proportion to each other but in opposite directions with respect to each other.

Electric motor 61 is suitably secured on base plate 34, and electrical conductor means 62 extends from motor 61 to a suitable skew and bow detecting means broadly designated at 63 (FIG. 1). Detecting means 63 is positioned adjacent the path of fabric movement and is capable of detecting and transmitting electrical signals reflecting either bow or skew fabric distortions or combinations thereof. As preferred, particularly in the processing of knitted fabrics, detecting means 63 is positioned adjacent the lightly tensioned, substantially relaxed or catenary portion of the fabric F below front stripper roll 21. Certain elements of the detecting means are mounted for scanning movement adjacent the fabric path, such as a pair of scanning discs 63a, 63b, which cooperate with respective light source means 63c, 63d located on the opposite side of the fabric F from the respective scanning discs 63a, 63b.

The detecting means 63 may be of a type such as that disclosed in U.S. Pat. Nos. 3,192,595 and 3,193,688, the disclosures of which are incorporated herein by reference. Accordingly, a further more detailed description of the construction and operation of the detecting means 63 is deemed unnecessary. As disclosed in said patents, especially with reference to FIG. 5 of Pat. No. 3,193,688, photoelectric receiver means is operatively associated with the respective scanning discs 63a, 63b of FIG. 2 of this application and transmits skew correction and/or bow correction signals, via the electrical conductor means 62, to the skew correction control motor 61 and/or to a reversible bow correction control motor 65 (FIG. 4) in accordance with the fabric distortions detected by detecting means 63. Bow correction motor 65 is shown in FIG. 4 in the form of a gear motor on the output shaft of which pulley 51 is secured. Motor 65 is suitably secured on base plate 34.

The arrangement is such that, when the courses of fabric F passing the scanning discs 63a, 63b (FIG. 2) are substantially straight and perpendicular to the fabric path, a balanced condition exists in the associated receiver means so that the motors 61, 65 are inactive. However, when detecting means 63 detects a skew distortion in the fabric F in which the right-hand side edge portion or selvage of the fabric, as viewed in FIG. 2, is skewed forwardly of the left-hand side edge portion or selvage thereof, the normally inactive skew correction motor 61 is activated to rotate in a forward direction. Conversely, when detecting means 63 detects a skewed distortion in fabric F, in which the left-hand side edge portion of fabric F as skewed forwardly of the right-hand side thereon as viewed in FIG. 2, skew correction motor 61 is activated to rotate in the opposite or reverse direction. Similarly, whenever a bowed distortion in fabric F is detected by detecting means 63, the normally inactive bow correction motor 65 is activated to rotate in a forward direction when the central portion of the fabric is bowed forwardly of or leads the opposing side edge portions thereof, and bow correction motor 65 is activated to rotate in the opposite or reverse direction when the medial portion of the fabric F is bowed rearwardly or lags with respect to the opposing side edge portions or selvages thereof.

Thus, housings 43 of the first and second differential units 36, 36a are driven to rotate in opposite directions with respect to each other, and at the same speed with respect to each other, only at such times that skewed distortions in fabric F are being detected by detecting means 63. Also, housing 43 of third differential unit 37 is driven to rotate in one direction or the other only at such times that bowed distortions in fabric F are being detected by detecting means 63. Whenever the three housings 43 are at a standstill, it is apparent that the pulleys 42 of all of the differential units 36, 36a, 37 rotate in the same direction and at the same constant angular speed.

The output pulleys 42 of first and second differential units 36, 36a may be drivingly connected to tenter chains 10, 10a by any suitable means, which may vary depending upon construction of the tenter and whether the tenter chain-supporting and driving sprockets are mounted on horizontal or vertical axes. In this instance, it will be observed in FIG. 2 that sprockets 13, 13a are mounted on vertical axes. Thus, the mechanism drivingly connecting pulleys 42 of first and second differential units 36, 36a to sprockets 13, 13a is shown in FIG. 4 as comprising a pair of first jack shafts 66, 67 and a pair of second jack shafts 66a, 67a suitably journaled in the frame of the tenter.

Jack shafts 66, 66a are disposed adjacent and forwardly of the main drive shaft and have respective pulleys 71, 71a fixed thereon and engaged by endless belts 72, 72a. Endless belts 72, 72a also engage pulleys 42 of the respective first and second differential units 36, 36a. The rear jack shafts 66, 66a are drivingly connected to front jack shafts 67, 67a by respective sprocket and chain connections 74, 74a, and the front jack shafts 67, 67a serve as the input shafts for respective gear boxes 75, 75a, on the output shafts of which the respective sprockets 13, 13a are suitably secured.

As shown in FIG. 4, the output pulley 42 of third differential unit 37 is drivingly connected to stripper rolls 20, 21 by means of an endless belt 80 mounted on pulley 42 of differential unit 37 and also mounted on a pulley 81 fixed on a jack shaft 82. Suitable belt and pulley means 83 drivingly connects jack shaft 82 to the input shaft of a suitable speed variator or variable speed drive mechanism 86 of any well known type provided with a manually operable regulator means or handle 86a for controlling the output speed of speed variator 86 to obtain the optimum rate of rotation of stripper rolls 20, 21.

The output shaft of speed variator 86 is drivingly connected to the outer end of one reduced end portion of front stripper roll 21 by a suitable sprocket and chain or pulley and belt means 87, and suitable gear means 90 drivingly connects front stripper roll 21 to rear stripper roll 20 so that both stripper rolls 20, 21 rotate at the same surface speed during operation of the tenter.

Although it is preferred that detecting means 63 (FIG. 1) is located downstream of stripper rolls 20, 21 in the region in which the fabric is relaxed or under minimal tension, detecting means 63 may be located in the region of tenter chains 10, 10a. In the latter instance, it is preferred that the detecting means is located upstream of and adjacent the front end portions of tenter chains 10, 10a and forwardly of cooling means 15. It has been determined that skew distortions in the fabric are corrected more efficiently when the detecting means is located upstream of and adjacent the front end portions of tenter chains 10, 10a than is the case when detecting means 63 is located downstream of stripper rolls 20, 21 as shown in FIGS. 1 and 2, because of the time-lag involved from the instant a given portion of the fabric approaches the egress end portions of tenter chains 10, 10a until such fabric portion enters the slack region downstream of stripper roll 21. However, the correction of fabric distortions is of a more permanent character when detected while the fabric is relaxed, because the fabric then is substantially free of any residual stretch and is in substantially the condition under which it will be delivered to a customer. In any event, it has been determined that bow distortions in the fabric are corrected more efficiently when the detecting means 63 is located in the position of FIGS. 1 and 2.

It is contemplated that two detecting means may be used with one detecting means occupying the position of detecting means 63 in FIGS. 1 and 2 for controlling bow correction motor 65 only, and with another detecting means located upstream of and adjacent the front end portions of tenter chains 10, 10a for detecting skew distortions only in the fabric and thus only controlling skew correction motor 61. An illustration of the latter arrangement is deemed unnecessary. From the standpoint of economy, it is preferred that only a single detecting means is used for controlling both motors 61, 65 and it has been determined that, if both motors 61, 65 are to be controlled by a common detecting means, as shown in FIGS. 1 and 2, the overall correction of both skew and bow distortions in the fabric is more efficient when the detecting means 63 is positioned downstream of stripper rolls 20, 21 than is the case when the detecting means is positioned upstream of the front ends of tenter chains 10, 10a.

In operation of the first embodiment of drive mechanism for tenter chains 10, 10a and stripper rolls 20, 21 it is apparent that main drive shaft 30 in FIG. 4 rotates at a constant speed during operation of the tenter. Thus, in the absence of any skew or bow distortions in fabric F in the region of the detecting means 63, all of the output pulleys 42 of differential units 36, 36a, 37 are driven at a constant speed; e.g., 600 revolutions per minute, to drive both tenter chains 10, 10a at a common and constant speed while also driving stripper rolls 20, 21 at a constant speed. The optimum constant speed of rotation of stripper rolls 20, 21 is established by manual adjustment of regulator means 86a of speed variator 86 so that the fabric is stripped and advanced from tenter chains 10, 10a at a forward speed corresponding substantially to the forward speed of tenter chains 10, 10a.

The guide rolls 22, 23 (FIGS. 1 and 2) also serve as delivery means for the fabric and are driven at such surface speed relative to that of stripper rolls 20, 21 that minimal tension is applied to the fabric passing between the front stripper roll 21 and guide roll 22. To this end, the shaft of stripper roll 21 is drivingly connected to guide roll 23 by suitable pulley and belt connections 92 (FIG. 2), and suitable gear means 93 drivingly connects guide roll 23 to guide roll 22. If desired, guide roll 22 may be in the form of a dancing roll of relatively light weight and simply resting upon and forming a loop in the fabric F, in which instance roll 22 would not be driven.

As heretofore stated, when detecting means 63 detects a skew distortion in fabric F in which the right-hand side edge portions of the courses of the fabric, as viewed in FIG. 2, are skewed forwardly of the left-hand side edge portions thereof, a skew correction signal is transmitted from detecting means 63 to activate and cause skew correction motor 61 to rotate in a forward direction. This rotates housing 43 of first differential unit 36 in a forward direction corresponding to the direction of rotation of main drive shaft 30. At the same time, housing 43 of second differential unit 36a rotates in a reverse direction with respect to, and at the same speed as, housing 43 of first differential unit 36. As a non-limiting example, the rate of rotation of the latter housings 43 may be such as to reduce the output speed of first differential unit 36 by about one-half to 2 percent as the output speed of second differential unit 36a is increased by the same amount, depending upon various factors, such as the length of the tenter, the speed of tenter chains 10, 10a, the width of the fabric F and the type of fabric being processed.

Thus, it can be seen that the forward speed of right-hand tenter chain 10 is reduced a predetermined amount relative to its normal speed simultaneously with which the forward speed of left-hand tenter chain 10a in FIG. 2 is increased by the same amount to straighten the skew distortion in the fabric F throughout the effective length of tenter chains 10, 10a and until a skew distortion in the fabric F is no longer detected by detecting means 63. It follows that the mean forward speed of tenter chains 10, 10a remains constant; i.e., the longitudinal central or medial portion of the fabric continues to move at a constant speed as determined by the speed of rotation of main drive shaft 30.

Upon detection of a skew distortion by detecting means 63, in which the left-hand side edge portion of fabric F, as viewed in FIG. 2, is skewed forwardly of the right-hand side edge portion thereof, skew correction motor 61 is activated to rotate in the reverse direction, thereby causing housings 43 of differential units 36, 36a to rotate in respective reverse and forward directions, but at the same speed, to proportionally increase and reduce the forward speed of the respective tenter chains 10, 10a until a skew distortion is no longer detected by detecting means 63.

Upon detection of a forward or rearward bow distortion in the courses of the fabric F by detecting means 63, regardless of whether or not skew correction motor 61 is then active, bow correction motor 65 receives a bow correction signal from detector means 63. If a forward bow distortion is then being detected by detecting means 63, the signal received by bow correction motor 65 causes the same to rotate in a forward direction to impart forward rotation to housing 43 of third differential unit 37. In so doing, the forward speed of rotation of stripper rolls 20, 21 and guide rolls 22, 23 is reduced a predetermined amount, thus reducing the speed at which the central portion of the fabric F is being pulled forwardly by stripper rolls 20, 21 relative to the mean forward speed of tenter chains 10, 10a, thereby correcting the forward bow distortion. It is apparent that housing 43 of third differential unit 37 continues to rotate in the forward direction, with corresponding decreased forward speed of rolls 21–23, until a bow distortion is no longer detected by detecting means 63. Thereupon, bow correction motor 65 is inactivated to stop rotation of housing 43 of third differential unit 37 so that rolls 20–23 resume their normal rate of rotation.

Upon a rearward bow distortion, in which the central portion of the fabric lags relative to opposing side edge portions thereof, being detected by detecting means 63, the signal thus transmitted to bow correction motor 65 causes the same to rotate in the reverse direction to rotate housing 43 of third differential unit 37 in a reverse direction, thereby increasing the peripheral speed of rolls 20–23 until such time as a lagging bow distortion no longer is being detected by detecting means 63. Thereupon, rolls 20–23 return to their normal speed. It is apparent that when the forward peripheral speed of rolls 20, 23 is increased this increases the forward speed of the central portion of the fabric F relative to the speed at which the opposing side edge portions thereof are being advanced by tenter chains 10, 10a, thus correcting the bow distortion in the fabric F without altering the mean forward speed of the fabric.

To aid further in obtaining a fabric having a substantially uniform yield throughout its length when the fabric emerges from the tenter, means are provided for sensing variations in density of the fabric being processed through the tenter and for compensatively varying the rate at which the fabric F is fed to the rear end portions of tenter chains 10, 10a. To this end, it will be observed in the left-hand portion of FIG. 1 that feed roll means 16 is driven by a drive mechanism broadly designated at 100 and comprising a constant-speed drive shaft or input element 101 driven by suitable connections with a motive means 102. A differential unit 103 of the type shown in FIG. 5 is mounted on shaft 101, and the rotary output of differential unit 103 is connected to the input shaft of a variable speed drive mechanism or speed variator 104 provided with a manually movable control means or handle 104a for establishing the optimum output speed of speed variator 104. The output portion of speed variator 104 is drivingly connected to feed roll means 16.

As is the case with respect to differential units 36, 36a, 37 in FIG. 4, the planetary housing of differential unit 103 is connected by suitable belt and pulley connections 106 to an electric, fabric-feeding control motor 107. Drive shaft 101, motive means 102, feed variator 104 and control motor 107 may be suitably mounted on a common base plate 110. Control motor 107 is connected by suitable conductor means 111 to a scanning sensing device 113 positioned in a region rearwardly of and adjacent the front end portions of tenter chains 10, 10a, and forwardly of cooling means 15, for detecting variations in density in the fabric F throughout the width thereof between tenter chains 10, 10a. Sensing device 113 may be of any well known type which will detect variations in density, including courses or picks per unit length, with respect to a predetermined normal number of courses or picks per unit length of the fabric. There are many known forms of sensing devices capable of producing control signals when the courses, picks or other density characteristics of a fabric vary above or below a predetermined normal density condition of the fabric. Accordingly, a detailed illustration and description of sensing device 113 is deemed unnecessary. By way of example, sensing device 113 may be of a type such as is distributed by Mahlo-American, Inc., Post Office Box 1352, Spartanburg, South Carolina 29301 and which is known as "The Mahlo FMIR-1."

In operation of feed roll drive mechanism 100, when the fabric passing through density sensing device 113 is of the desired predetermined normal density, drive shaft 101 drives feed roll means 16 at a constant speed through the output portion of differential unit 103 and through speed variator 104. Upon control motor 107 receiving a signal from sensing device 113 indicating that the density of fabric F is greater than the desired normal density, motor 107 drives the housing of differential unit 103 in a forward direction, corresponding to the normal direction of rotation of drive shaft 101, but at a slower speed than shaft 101. In so doing, the output portion of differential unit 103 is reduced to correspondingly reduce the speed of feed roll means 16 to a predetermined extent. It follows that the density of the fabric is gradually and progressively reduced in its course throughout the tenter chains 10, 10a until such time as sensing device 113 no longer detects a greater than normal density in fabric F. Thereupon, the signal to the control motor 107 is interrupted to stop rotation of the housing of differential unit 103 and thus return feed roll means 16 to its normal speed determined by the position of the manually operated control means 104a of speed variator 104.

Upon sensing device 113 detecting an abnormally low density in fabric F, another signal is transmitted to control motor 107 causing the same to rotate the housing of differential unit 103 in the reverse direction, thereby increasing the speed of the feed roll means 16 and maintaining such speed thereof until the relatively low density condition of the fabric has been corrected and is no longer being sensed by sensing device 113.

SECOND EMBODIMENT

Figure 6:
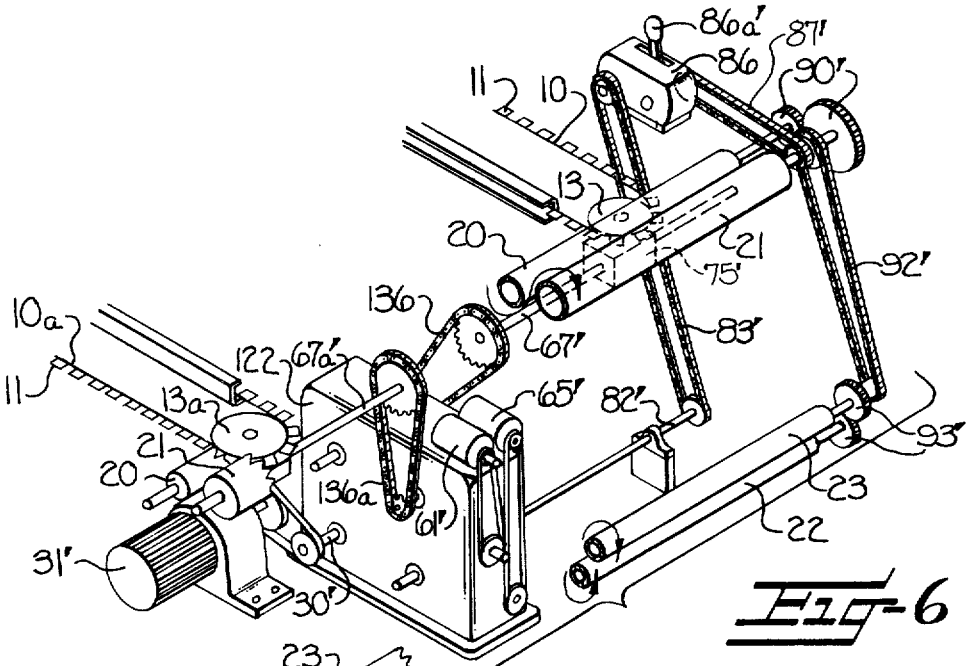
FIG. 6 is a schematic perspective view of a second embodiment of drive mechanism for the stripper roll means and tenter chains of the tenter.
Figure 7:
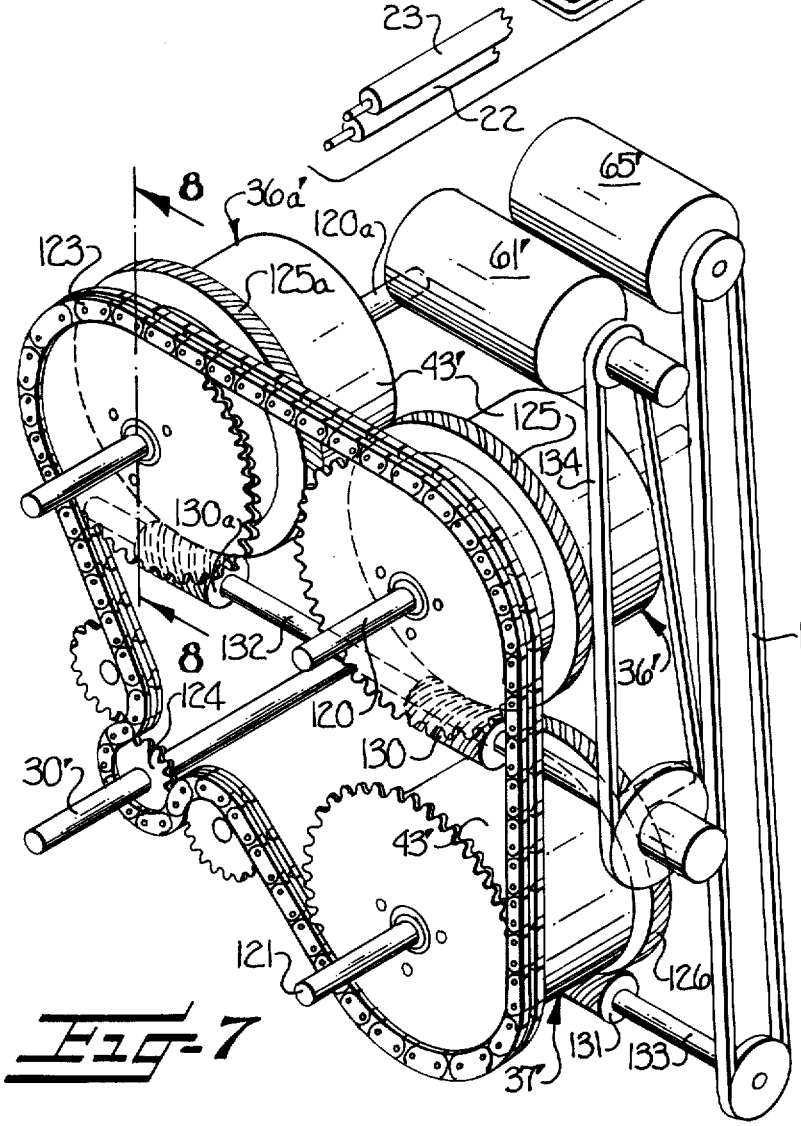
FIG. 7 is a somewhat schematic, enlarged, perspective view of the differential units and related drive means disposed within the housing shown in the lower central portion of FIG. 6.
Figure 8:
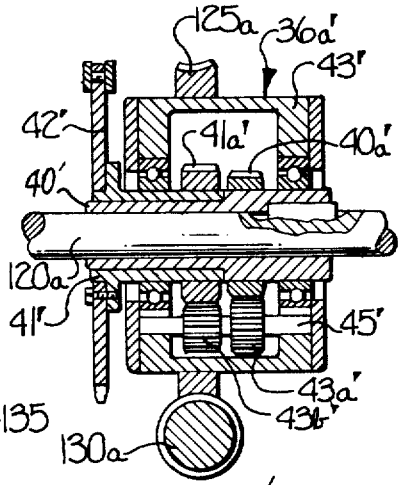
FIG. 8 is a vertical sectional view through one of the differential units as used in the second embodiment of the drive mechanism, and being taken substantially along line 8—8 in FIG. 7.

The second embodiment of the drive mechanism for the tenter chains and the fabric advancing means or stripper rolls is shown in FIGS. 6, 7, and 8, wherein the tenter chains, stripper rolls and guide rolls bear the same respective reference characters 10, 10a, 20, 21, 23, 23 as are applied to these same elements in FIGS. 1, 2, and 3. Other elements shown in FIGS. 6, 7, and 8 which are similar to elements shown in FIGS. 1–5 will bear the same reference characters with the prime notation added, in order to avoid repetitive description.

Essentially, the second embodiment of FIGS. 6, 7, and 8 differs from the first embodiment of FIGS. 1–5 in that the first, second and third differential units 36', 36a', 37' are not mounted on a common main drive shaft, as in FIG. 4, but are mounted on separate laterally spaced output shafts 120, 120a, 121, respectively. Output shafts 120, 120a, 121 are arranged in spaced parallel relation to each other and in parallel relation to a main drive shaft or input element 30'. Shafts 30', 120, 120a, 121 are journaled in an upright casing or housing 122. Differential units 36', 36a', 37' may be substantially identical, with the exception of the respective output shafts upon which they are mounted. Accordingly, only differential unit 36a' is shown in detail in FIG. 8 wherein it will be observed that elements 40', 40a', 41', 41a', 43', 43a', 43b' and 45' in FIG. 8 may be identical to corresponding elements shown in FIG. 5, with the important exception that axial sleeve or hub 40' serves as the output portion of differential unit 36a', and hub 41' serves as the input portion of differential unit 36a'.

Each input hub 41' has a sprocket 42' secured thereon exteriorly of housing 43', and all of the sprockets 42' are engaged by a common endless sprocket chain 123 which engages a sprocket 124 fixed on main drive shaft 30' (FIG. 7). Secured to or formed integral with housings 43' of differential units 36', 36a', 37' are respective peripherally disposed worm gears 125, 125a, 126 which are engaged by respective spiral gears or worms 130, 130a, 131. Upper and lower control shafts 132, 133 are journaled in housing 122, and upper control shaft 132 has the worms 130, 130a fixed theron. Lower control shaft 133 has worm 131 fixed thereon. The lead direction of the threads or teeth of worm 130 is opposite from that of worm 130a so that, during rotation of shaft 132 in either direction, housings 43' of differential units 36', 36a' rotate in opposite directions at the same angular speed relative to each other. Corresponding ends of control shafts 132, 133 are connected, by respective pulley and belt connections 134, 135, to respective reversible electric control motors 61', 65' which perform the same functions as the control motors 61, 65 of FIG. 4.

As shown in FIG. 6, output shafts 120, 120a of differential units 36', 36a' are drivingly connected to the respective shafts 67', 67a', as by means of suitable sprocket and chain connections 136, 136a, respectively, for driving the respective tenter chains 10, 10a in essentially the same manner as that described with respect to the first embodiment of the invention. Also, output shaft 121 of third differential unit 37' is coupled to or formed integral with shaft 82' for driving stripper rolls 20, 21 and guide rolls 22, 23 of FIG. 6 in essentially the same manner as that described with respect to the first embodiment of the invention.

Control motors 61', 65' of the second embodiment of the invention are operatively connected to the detecting means 63 in the manner heretofore described with respect to the first embodiment of the invention. Accordingly, it is apparent that the drive mechanism of the second embodiment of the invention functions in a manner quite similar to that of the first embodiment of the invention and, therefore, a detailed description of the operation of the second embodiment of the invention is deemed unnecessary. Of course, as heretofore indicated, since main drive shaft 30' transmits substantially constant speed rotation to the input hubs 41' of all three differential units 36', 36a', 37', it follows that the output shafts 120, 120a, 121 normally rotate at a substantially constant speed, and when control motors 61', 65' drive the respective shafts 132, 133 for correcting respective skew and bow distortions in the fabric on the tenter, it is apparent that rotation of the housings 43' thus being effected varies the speed of the respective output shafts 120, 120a, 121, accordingly.

It is thus seen that we have provided an improved method and apparatus for correcting skew and bow distortions and abnormal density conditions in fabrics being processed on a tenter while maintaining the rate of forward travel of the medial portion of the textile fabric at a constant speed contributing to production of fabric of uniform weight or density per unit length thereof. It is seen that we have also further augmented production of fabrics of substantially uniform weight or density per unit length on the tenter by automatically controlling the rate of feed of the fabric into the tenter in response to a sensing means capable of detecting variations in density; such as picks per unit length and/or courses per unit length, in the fabric in its course through the tenter.

In the drawings and specification there has been set forth preferred embodiments of the invention and, although specific terms are employed, they are used in a generic and descriptive sense only.

That which is claimed is:

1. In a tenter having a pair of laterally spaced, elongate and longitudinally movable first and second fabric-engaging tenter chains for moving a fabric forwardly while applying lateral tension to the fabric therebetween; the combination therewith of a. [tenter chains] *means* for driving said [fabric-engaging means] *tenter chains* to move at least the longitudinal center of the fabric therebetween at a predetermined substantially constant lineal speed and including a rotary input element adapted to be driven forwardly at a constant speed, b. detecting means for detecting and producing a signal in response to a skew distortion in the forwardly moving fabric in which one side edge portion of the fabric is skewed forwardly of the opposite side edge portion thereof, and c. responsive means interposed in said driving means and responsive to a skew correction signal of said detecting means for oppositely varying the lineal speed of said pair of fabric-engaging tenter chains in direct proportion to each other to correct the skew distortion without altering said constant lineal speed of the longitudinal center of the fabric, said responsive means comprising 1. first and second differential units including respective first and second rotary input portions driven by said input element, first and second rotary output portions on the respective first and second differential units drivingly connected to the respective first and second tenter chains, said first and second differential units also including first and second normally stationary rotary [housings] *members*, planetary gear means [in each housing] *carried by each rotary member*, and sun gears fixed on the input portion and the output portion, respectively, of each differential unit and meshing with the respective planetary gear means whereby each output portion is driven at a constant speed by said rotary input element while the respective [housings] *rotary members* are stationary, and 2. reversible means under control of said detecting means for rotating said first and second [housings] *rotary members* simultaneously in [opposite] directions [relative to each other whereby, when either housing rotates in a forward direction,] *required to increase and decrease by corresponding amounts* the [speed] *speeds* of the output [portion] *portions* of the respective differential [unit is reduced and the other housing is rotated in a reverse direction to increase the speed of the output portion of the other differential unit] *units.*

2. Apparatus according to claim 1, wherein said input element includes a drive shaft extending through and supporting both of said first and second differential units thereon, and means securing said first and second rotary input portions on said drive shaft.

3. Apparatus according to claim 1, wherein said reversible means comprises a reversible electric motor, common to both of said first and second [housings] *rotary members* and being electrically connected to said detecting means, and transmission means for transmitting rotation from said motor to said first and second [housings] *rotary members* simultaneously in opposite directions relative to each other upon said detecting means detecting a skewed distortion in the fabric.

4. Apparatus according to claim 1, wherein said first and second differential units are arranged with the axes of their respective [housings] *rotary members* disposed in laterally spaced, substantially parallel relationship, said input element comprising a drive shaft disposed in spaced substantially parallel relation from said [housing] *rotary members* and driving connections between said drive shaft and the input portions of said first and second differential units.

5. Apparatus according to claim 1, including a. advancing means driven by said drive means for engaging the width of the fabric and advancing the same forwardly away from said fabric-engaging tenter chains, b. said detecting means including means for detecting a bowed distortion in the forwardly moving fabric, and c. a third differential unit comprising 1. a third rotary input portion driven by said input element.

2. a third rotary output portion drivingly connected to said advancing means, and 3. a third normally stationary rotary [housing] *member* having planetary gear means in said [housing] *member*, and sun gears fixed on the input portion and output portion, respectively, and meshing with the planetary gear means for normally transmitting substantially constant-speed rotation from said third input portion to said third output portion while the [housing] *member* is stationary, and d. additional reversible means responsive to said detecting means detecting a bowed distortion in the fabric for driving said third [housing] *member* in a direction corresponding to the direction of the bowed distortion being detected to vary the speed of said advancing means to thereby correct the bowed distortion in the fabric.

6. In a tenter having a pair of laterally spaced, elongate and longitudinallly movable first and second fabric-engaging means for moving a fabric forwardly while applying lateral tension to the fabric therebetween; the combination therewith of a. means for driving said fabric-engaging means to move at least the longitudinal center of the fabric therebetween at a predetermined substantially constant lineal speed, b. advancing means driven by said drive means for engaging the width of the fabric and advancing the same forwardly away from said fabric-engaging means, c. detecting means for detecting and producing a signal in response to a skew distortion in the forwardly moving fabric in which one side edge portion of the fabric is skewed forwardly of the opposite side edge portion thereof and for detecting and producing a bow correction signal in response to a bowed distortion in the forwardly moving fabric, d. first responsive means interposed in said driving means and responsive to a skew correction signal of said detecting means for oppositely varying the lineal speed of said pair of fabric-engaging means in direct proportion to each other to correct the skew distortion without altering said constant lineal speed of the longitudinal center of the fabric, and e. second responsive means interposed in said driving means and responsive to a bow correction signal of said detecting means in which the central portion of the fabric is lagging or leading the opposite side edge portions thereof, for compensatively varying the speed of said advancing means to correct the bowed condition of the fabric.

7. Apparatus according to claim 6, wherein said means for compensatively varying the speed of said advancing means comprises a. a speed variator having 1. a driven rotary input portion, 2. a rotary output portion drivingly connected to said advancing means, and 3. movable means under control of said detecting means detecting a bowed distortion in the fabric for varying the speed of said output portion relative to the speed of said input portion.

8. Apparatus according to claim 7, wherein said speed variator comprises a differential unit and said lastnamed movable means comprises a normally stationary rotary housing having planetary gear means therein for transmitting rotation from said input portion to said output portion, and reversible means under control of said detecting means for rotating said housing in response to detection of a bowed distortion being detected to vary the speed of said advancing means and thereby correct the bowed distortion in the fabric.

9. In a tenter having a pair of laterally spaced, elongate and longitudinally movable fabric-engaging means for moving forwardly a fabric held therebetween; the combination therewith of a. drive means drivingly connected to and normally imparting substantially constant forward lineal speed to said pair of fabric-engaging means and including a rotary input element adapted to be driven forwardly at a constant speed, b. detecting means responsive to detection of skew distortions in the fabric for producing skew correction signals, and c. a pair of separate differential units for the respective fabric-engaging means, each differential unit including 1. an input portion driven by said input element, 2. an output portion drivingly connected to the respective fabric-engaging means, and 3. a normally stationary rotary member having planetary gear means for normally transmitting substantially constant-speed rotation to said output portion from said input portion, and d. [a] normally inactive reversible electric motor *means* responsive to said skew correction signals for rotating one of said rotary members in that direction required to [correct a corresponding skew distortion in the fabric] *increase the speed of the output portion of its differential unit by a predetermined amount* and *for* simultaneously rotating the other of said rotary members in [the opposite] *that* direction [from said one of said rotary members, so that, when either housing rotates in a forward direction, the speed of the output portion of the same differential unit is reduced as the other housing rotates in a reverse direction to increase the speed of the output portion of the respective other differential unit] *required to reduce the speed of the output portion of its differential unit by a corresponding predetermined amount*, whereby whenever the speed of either fabric-engaging means is increased to correct a skewed distortion in the fabric, the speed of the other fabric-engaging means is correspondingly reduced, such that the sum of the speeds of the two fabric-engaging means is equal to said constant forward speed to thereby vary the forward speed of opposite side edge portions of the fabric for correcting a skewed distortion thereof without altering the mean forward speed of the fabric.

10. In a tenter having a pair of laterally spaced, elongate and longitudinally movable fabric-engaging means for moving forwardly a fabric held therebetween; the combination therewith of a. drive means drivingly connected to and normally imparting substantially constant forward lineal speed to said pair of fabric-engaging means and including a rotary input element adapted to be driven forwardly at a constant speed, b. detecting means responsive to detection of skew and bow distortions in the fabric for producing skew correction signals and bow correction signals, c. a pair of separate differential units for the respective fabric-engaging means, each differential unit including 1. an input portion driven by said input element, 2. an output portion drivingly connected to the respective fabric-engaging means, and 3. a normally stationary rotary member having planetary gear means for normally transmitting substantially constant-speed rotation to said output portion from said input portion, d. reversible means for, at times, rotating both of said rotary members simultaneously in opposite directions relative to each other so that, when either housing rotates in a forward direction, the speed of the output portion of the same differential unit is reduced as the other housing rotates in a reverse direction to increase the speed of the output portion of the respective other differential unit whereby whenever the speed of either fabric-engaging means is increased to correct a skewed distortion in the fabric, the speed of the other fabric-engaging means is correspondingly reduced, such that the sum of the speeds of the two fabric-engaging means is equal to said constant forward speed to thereby vary the forward speed of opposite side edge portions of the fabric for correcting a skewed distortion thereof without altering the means forward speed of the fabric, e. bow correction means including advancing means for advancing the fabric forwardly away from said fabric-engaging means and having an additional differential unit also comprising 1. an input portion driven by said input element,
2. an output portion drivingly connected to said advancing means, and
3. an additional normally stationary rotary member having corresponding planetary gear means for normally transmitting substantially constant-speed rotation to the last-named output portion from the last-named input portion, and f. a normally inactive reversible electric motor responsive to said bow correction signals for rotating said additional rotary member in that direction required to alternatively increase and decrease the speed of said advancing means for correcting bowed distortions in the fabric.

11. In a tenter having a pair of laterally spaced, elongate and longitudinally movable first and second fabric-engaging means for moving a fabric forwardly while applying lateral tension to the fabric therebetween; the combination therewith of a. means for feeding fabric to said fabric-engaging means, b. control means for said feeding means including 1. sensing means adjacent said fabric-engaging means for sensing variations in density of forwardly moving fabric; and
2. means responsive to said sensing means for varying the speed of said feeding means in accordance with density variations being sensed by said sensing means, c. means for driving said fabric-engaging means to move at least the longitudinal center of the fabric therebetween at a predetermined substantially constant lineal speed, d. detecting means for detecting and producing a signal in response to a skew distortion in the forwardly moving fabric in which one side edge portion of the fabric is skewed forwardly of the opposite side edge portion thereof, e. responsive means interposed in said driving means and responsive to a skew correction signal of said detecting means for oppositely varying the lineal speed of said pair of fabric-engaging means in direct proportion to each other to correct the skew distortion without altering said constant lineal speed of the longitudinal center of the fabric, f. advancing means disposed on the output side of said fabric-engaging means and adapted to engage the corrected fabric for positively and continuously advancing the corrected fabric away from said fabric-engaging means, g. delivery means disposed on the opposite side of said advancing means from said fabric-engaging means and in spaced relation to said advancing means and adapted to receive the corrected fabric from the advancing means and to continuously deliver the fabric therefrom, h. said detecting means being positioned between said advancing means and said delivery means adjacent the path of fabric movement therebetween for detecting skew distortions in the fabric while in relaxed state, and i. drive means connected to said advancing means and said delivery means for continuously driving the same at lineal speeds sufficient to advance the corrected fabric past said detecting means under minimal tension whereby the corrective action on the fabric is substantially improved.

12. Apparatus according to claim 11, wherein said control means further comprises a drive shaft adapted to be driven at a constant speed, and said means responsive to said sensing means comprises a. a differential gear unit including 1. an input portion operatively connected to and driven by said drive shaft,
2. an output portion drivingly connected to said feeding means, and
3. a normally stationary rotary housing having planetary gear means therein normally transmitting constant-speed rotation to said output portion from said input portion, and b. reversible means responsive to said sensing means sensing other than a predetermined normal density of the fabric for rotating said housing in a direction required to vary the rate of feed of the fabric to return the same to said normal density.

* * * * *